United States Patent
Kyo

(10) Patent No.: US 10,084,208 B2
(45) Date of Patent: Sep. 25, 2018

(54) LEAD-ACID BATTERY

(71) Applicant: GS Yuasa International Ltd., Kyoto-shi, Kyoto (JP)

(72) Inventor: Masaaki Kyo, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 116 days.

(21) Appl. No.: 14/957,167

(22) Filed: Dec. 2, 2015

(65) Prior Publication Data

US 2016/0181670 A1  Jun. 23, 2016

(30) Foreign Application Priority Data

Dec. 18, 2014 (JP) ................................. 2014-255971
Nov. 9, 2015 (JP) ................................. 2015-219332

(51) Int. Cl.
| | | |
|---|---|---|
| H01M 4/14 | (2006.01) | |
| H01M 10/08 | (2006.01) | |
| H01M 10/06 | (2006.01) | |
| H01M 2/02 | (2006.01) | |
| H01M 4/583 | (2010.01) | |
| H01M 10/10 | (2006.01) | |

(52) U.S. Cl.
CPC ......... *H01M 10/08* (2013.01); *H01M 2/0237* (2013.01); *H01M 4/14* (2013.01); *H01M 4/583* (2013.01); *H01M 10/06* (2013.01); *H01M 10/10* (2013.01); *H01M 2220/20* (2013.01)

(58) Field of Classification Search
CPC ........ H01M 4/14; H01M 10/06; H01M 4/583; H01M 10/08; H01M 2/0237; H01M 10/10; H01M 2220/20
See application file for complete search history.

(56) References Cited

U.S. PATENT DOCUMENTS

| 2006/0154148 A1 | 7/2006 | Tomotaka | |
|---|---|---|---|
| 2013/0099749 A1* | 4/2013 | Shibahara | H02J 7/00 320/128 |
| 2015/0357643 A1* | 12/2015 | Atanassova | H01M 4/57 252/509 |

FOREIGN PATENT DOCUMENTS

| EP | 2571091 | 3/2013 |
|---|---|---|
| JP | 60107263 A2 | 6/1985 |
| JP | 60167266 A2 | 8/1985 |
| JP | 4206268 A2 | 7/1992 |
| JP | 4312768 A2 | 11/1992 |
| JP | 8241718 A2 | 9/1996 |
| JP | 9161802 A2 | 6/1997 |
| JP | 2000058046 A2 | 2/2000 |
| JP | 2001023682 A2 | 1/2001 |
| JP | 2001-307733 | 11/2001 |
| JP | 2002222661 A2 | 8/2002 |
| JP | 2002313332 A2 | 10/2002 |
| JP | 2003100289 A2 | 4/2003 |
| JP | 2003142085 A2 | 5/2003 |
| JP | 2003178806 A2 | 6/2003 |
| JP | 2004055323 A2 | 2/2004 |
| JP | 2004281197 A2 | 10/2004 |
| JP | 2004327299 A2 | 11/2004 |
| JP | 2007026753 A2 | 2/2007 |
| JP | 2008243489 A2 | 10/2008 |
| JP | 2009104914 A2 | 5/2009 |
| JP | 2010102922 A2 | 5/2010 |
| JP | 2011233390 A2 | 11/2011 |
| JP | 2012142185 A2 | 7/2012 |
| JP | 2013-041848 | 2/2013 |
| JP | 2013-140678 | 7/2013 |

OTHER PUBLICATIONS

Extended European Search Report dated Feb. 12, 2016 issued in the corresponding European patent application No. 15197187.6.

* cited by examiner

*Primary Examiner* — Muhammad S Siddiquee
(74) *Attorney, Agent, or Firm* — Rankin, Hill & Clark LLP

(57) ABSTRACT

A lead-acid battery, including: a positive electrode plate; a negative electrode plate; an electrolyte solution; and a container having a cell chamber in which the positive electrode plate, the negative electrode plate and the electrolyte solution are accommodated. A concentration of Ba sulfate contained in a negative electrode material of the negative electrode plate is 1.0 mass % or more, and a Na concentration in the electrolyte solution is 0.04 mol/L or less.

17 Claims, 6 Drawing Sheets

LEAD-ACID BATTERY

CROSS-REFERENCE TO RELATED APPLICATIONS

This application claims the benefit of Japanese patent applications No. 2014-255971, filed on Dec. 18, 2014, and No. 2015-219332, filed on Nov. 9, 2015, which are incorporated by reference.

FIELD

The present invention relates to a lead-acid battery.

BACKGROUND

JP-A-2012-142185 discusses improving the life performance of a lead-acid battery in an idling-stop mode at both normal and high temperatures. For this purpose, it proposes that: a Pb—Sn—Sb alloy layer is provided on the surface of a negative electrode grid; Li and Al are contained in electrolyte solution; and Na concentration of the electrolyte solution is set to be 0.04 mol/L or less.

In addition, for the electrode material of the negative electrode, 0.6 mass % of Ba sulfate is contained relative to 98.8 mass % of a lead powder. However, changing the Ba sulfate concentration from 0.6 mass % has not been considered.

In JP-A-2001-23682, the volume of an element of a sealed type lead-acid battery is defined by the height of electrode plates×the width of the electrode plates×the thickness of the element. It is disclosed that when the mass of a negative active material per unit volume of the element is 0.84 g/cm$^3$ or more and 1.20 g/cm$^3$ or less, the high-rate discharge performance improves. However, the influences of the Ba sulfate concentration and the Na concentration have not been examined.

JP-A-2003-178806 discusses the influences of the mass of the positive active material and the mass of the negative active material in a valve-regulated lead-acid battery, and shows an example in which the density of the positive active material is 4.20 g/cm$^3$, and the mass ratio between the positive active material and the negative active material is 1.2.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In a mode like an idling-stop mode, a lead-acid battery is not sufficiently charged, and thus the crystallization of lead sulfate is likely to proceed in the negative active material. In addition, the battery is not charged to generate a large amount of gas, and thus the electrolyte solution is likely to be stratified. When the electrolyte solution is stratified, some electrode plates are used locally, causing a further decrease in the life performance.

In order to solve these problems, it is necessary to improve the charge acceptance performance and suppress the crystallization of lead sulfate. Ba sulfate improves the charge acceptance performance in the case where the battery is charged without being remained untouched after the discharge. However, it has been revealed that in the case where the battery is charged after some time has passed since the discharge, the charge acceptance performance is reduced by Ba sulfate. In order to suppress the crystallization of lead sulfate, the charge acceptance performance immediately after discharge and that after being remained untouched are both important. In addition, internal resistance is an important index, which indicates the degradation state of the lead-acid battery, and is also used to determine whether idling-stop is possible in idling-stop vehicles. When there is a small increase in the internal resistance in accordance with the progress of charge-discharge cycles, this indicates that the degradation of electrode plates is slow, the degradation of electrode plates is uniformly progressing, etc.

The present invention is aimed at providing a lead-acid battery whose charge acceptance performance does not decrease much even in the case where the battery is charged after some time has passed since the discharge.

An aspect of the present invention provides a lead-acid battery including a positive electrode plate, a negative electrode plate, and an electrolyte solution placed in a cell chamber of a container. In a negative electrode material of the negative electrode plate, the concentration of Ba sulfate contained in the electrode material after full charge is 1.0 mass % or more, and the Na concentration in the electrolyte solution is 0.04 mol/L or less.

BRIEF DESCRIPTION OF DRAWINGS

The foregoing and other features of the present invention will become apparent from the following description and drawings of an illustrative embodiment of the invention in which.

DESCRIPTION OF EMBODIMENTS

According to an aspect of the present invention, there is provided a lead-acid battery including a positive electrode plate, a negative electrode plate, and an electrolyte solution placed in a cell chamber of a container, in a negative electrode material of the negative electrode plate, the concentration of Ba sulfate contained in the electrode material after full charge is 1.0 mass % or more, and the Na concentration in the electrolyte solution is 0.04 mol/L or less.

Figure 3:
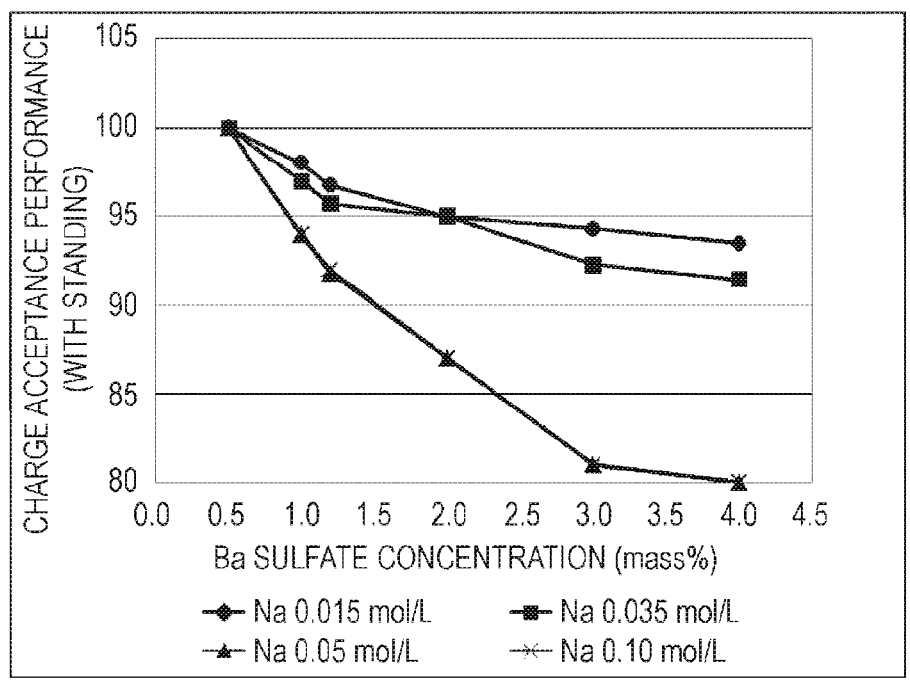
FIG. 3 is a characteristic diagram showing the charge acceptance performance with being remained untouched (standing) under conditions where NP/V is fixed to 1.40 g/cm$^3$, the Na concentration is varied within a range of 0.015 mol/L to 0.1 mol/L, and the Ba sulfate concentration is varied within a range of 0.5 mass % to 4 mass % (expressed as a value relative to the charge acceptance performance in the case where the Ba sulfate concentration is 0.5 mass % at each Na concentration (=100)).

An increase in the Ba sulfate concentration in the negative electrode material results in the improvement of the charge acceptance performance in the case where the battery is charged without standing following discharge. However, the present inventors have found that when only the Ba sulfate concentration is increased, in the case where the battery is charged after standing following discharge, the charge acceptance performance rather decreases. Further, to deal with this, the present inventors have found that when the Na concentration in the electrolyte solution is 0.04 mol/L or less, a decrease in the charge acceptance performance after standing due to the addition of Ba sulfate can be suppressed (FIG. 3). That is, when the Na concentration in the electrolyte solution is limited to 0.04 mol/L or less, and the Ba sulfate concentration in the negative electrode material is 1.0 mass % or more, a lead-acid battery, in which a decrease in the charge acceptance performance in the case where the battery is charged after standing following discharge is suppressed, is obtained. In conventional lead-acid batteries, in order to suppress a penetration short circuit, the Na concentration in the electrolyte solution is generally made about 0.1 mol/L to 0.2 mol/L. Therefore, it is not easy to conceive of a Na concentration of 0.04 mol/L or less.

Figure 4:
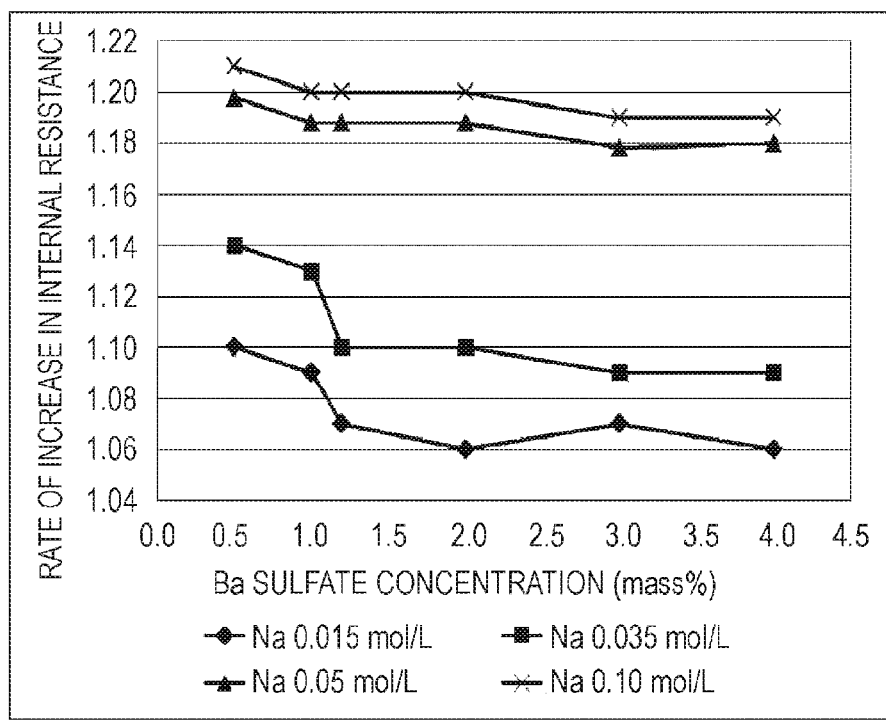
FIG. 4 is a characteristic diagram showing the rate of increase in the internal resistance at the 2000$^{th}$ cycle under conditions where NP/V is fixed to 1.40 g/cm$^3$, the Na concentration is varied within a range of 0.015 mol/L to 0.1 mol/L, and the Ba sulfate concentration is varied within a range of 0.5 mass % to 4 mass %.

Further, when the Na concentration in the electrolyte solution is limited to 0.04 mol/L or less, and the Ba sulfate concentration in the negative electrode material is 1.2 mass % or more, an increase in the internal resistance of a lead-acid battery in accordance with the progress of charge-discharge cycles when used under PSOC (Partial State of Charge) conditions can be suppressed (FIG. 4). Meanwhile, even when the Na concentration in the electrolyte solution is limited to 0.04 mol/L or less, if the Ba sulfate concentration in the negative electrode material is 1.0 mass % or less, the suppressing effect on an increase in the internal resistance in accordance with the progress of charge-discharge cycles is small. Thus, the tendency is significantly different between Ba sulfate concentrations of 1.0 mass % or less and 1.2 mass % or more (FIG. 4). In addition, in the case where the Na concentration in the electrolyte solution is more than 0.04 mol/L, even when the Ba sulfate concentration in the negative electrode material is 1.2 mass % or more, the rate of increase in the internal resistance in accordance with the progress of charge-discharge cycles does not significantly change (FIG. 4). It has been heretofore unknown that an increase in the internal resistance in accordance with the progress of charge-discharge cycles is suppressed in the case where the Ba sulfate concentration in the negative electrode material is 1.2 mass % or more and the Na concentration in the electrolyte solution is 0.04 mol/L or less. Thus, this is an unexpected result.

Incidentally, in place of Ba sulfate, it is also possible to use elemental Ba or a Ba compound such as Ba carbonate. This is because even when elemental Ba or a Ba compound is added to the negative electrode material, it turns into Ba sulfate after addition. Elemental Ba or a Ba compound is added such that the concentration in terms of Ba sulfate will be 1.0 mass % or more, preferably 1.2 mass % or more, relative to the mass of the negative electrode material after full charge. As a concentration in terms of Ba, addition is made such that the concentration will be 0.6 mass % or more, preferably 0.7 mass % or more, relative to the mass of the negative electrode material after full charge.

When the Ba sulfate concentration in the negative electrode material is more than 4.0 mass %, the paste of the negative electrode material becomes so hard that it is difficult to apply the paste to a negative electrode current collector. Therefore, it is preferable that the Ba sulfate concentration in the negative electrode material after full charge is 4.0 mass % or less, more preferably 3.5 mass % or less. As a concentration in terms of Ba, it is preferable that the concentration is 2.4 mass % or less, more preferably 2.1 mass % or less, relative to the mass of the negative electrode material after full charge.

The Na concentration of the electrolyte solution is the lower the better. In the aspect of the present invention, the Na concentration is 0.04 mol/L or less, preferably 0.035 mol/L or less. Na is mixed in from lignin or the like added to the negative electrode material. Therefore, it is difficult to make the Na concentration 0, and the concentration is practically 0.001 mol/L or more. When the Na concentration is limited, it becomes necessary to reduce the amount of lignin or the like added to the negative electrode material, resulting in a decrease in the life performance of the lead-acid battery. Therefore, it is more preferable that the Na concentration is 0.005 mol/L or more. In addition, Li, Al, and the like in the electrolyte solution do not inhibit the effect of Ba sulfate (improvement of charge acceptance performance), and thus their contents are arbitrary.

When the total mass of negative electrode plates in a cell chamber is expressed as NP (g), and the volume defined by the height h (cm) of the negative electrode plates×the width w (cm) of the negative electrode plates×the inside dimension d (cm) of the cell chamber in a direction perpendicular to the negative electrode plates is expressed as V (V=hwd), it is preferable that NP/V is 1.3 g/cm$^3$ or more and 1.6 g/cm$^3$ or less. It is more preferable that NP/V is 1.4 g/cm$^3$ or more and 1.5 g/cm$^3$ or less. Incidentally, the height and width of a negative electrode plate are determined ignoring the parts projecting from the negative electrode plate, such as lugs and feet.

Figure 5:
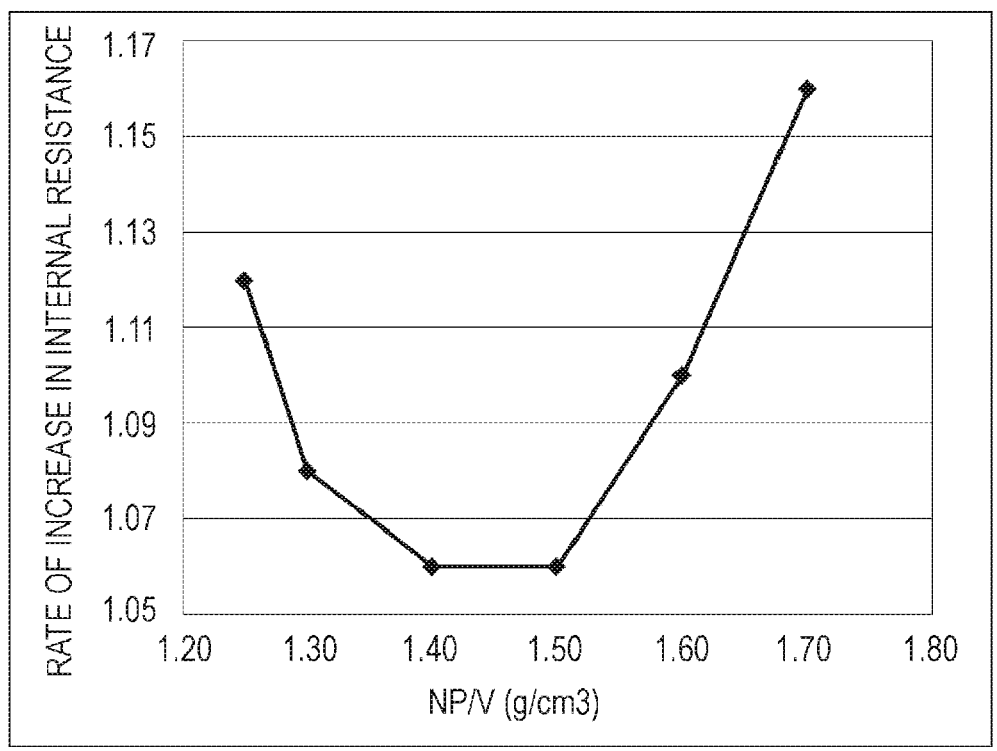
FIG. 5 is a characteristic diagram showing the rate of increase in the internal resistance at the 2000$^{th}$ cycle under conditions where NP/V is varied within a range of 1.25 g/cm$^3$ to 1.70 g/cm$^3$.

When the Ba sulfate concentration in the negative electrode material and the Na concentration of the electrolyte solution are determined as described above (according to the aspect of the present invention), and NP/V is 1.3 g/cm$^3$ or more and 1.6 g/cm$^3$ or less, an increase in the internal resistance in accordance with the progress of charge-discharge cycles can be suppressed (FIG. 5). When NP/V is 1.4 g/cm$^3$ or more and 1.5 g/cm$^3$ or less, an increase in the internal resistance in accordance with the progress of charge-discharge cycles can be even more suppressed (FIG. 5). It has been heretofore unknown that NP/V is associated with an increase in the internal resistance in accordance with the progress of charge-discharge cycles. Therefore, it can be said that it is an unexpected result that an increase in the internal resistance with the progress of charge-discharge cycles can be suppressed by making NP/V 1.3 g/cm$^3$ or more and 1.6 g/cm$^3$ or less, preferably 1.4 g/cm$^3$ or more and 1.5 g/cm$^3$ or less.

Figure 6:
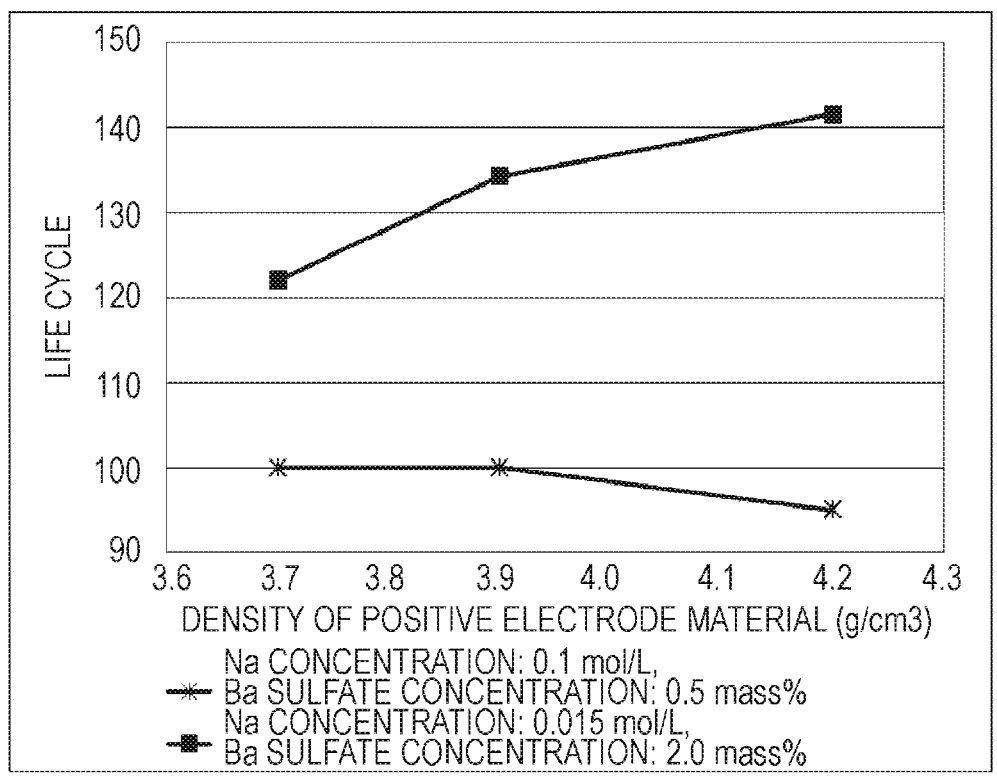
FIG. 6 is a characteristic diagram showing the number of life cycles under conditions where the density of the positive electrode material is varied within a range of 3.7 g/cm$^3$ to 4.2 g/cm$^3$.

It is preferable that the density of the positive electrode material is 3.8 g/cm$^3$ or more, more preferably 3.9 g/cm$^3$ or more. In the case where the Ba sulfate concentration in the negative electrode material is 1.0 mass % or more, and the Na concentration in the electrolyte solution is 0.04 mol/L or less, when the density of the positive electrode material is 3.8 g/cm$^3$ or more, the life performance of the lead-acid battery significantly improves (FIG. 6). Meanwhile, not in the case where the Ba sulfate concentration in the negative electrode material is 1.0 mass % or more and the Na concentration in the electrolyte solution is 0.04 mol/L or less, when the density of the positive electrode material is 3.8 g/cm$^3$ or more, the life performance of the lead-acid battery rather decreases (FIG. 6). It is an unexpected result that only in the case where the Ba sulfate concentration in the negative electrode material is 1.0 mass % or more and the Na concentration in the electrolyte solution is 0.04 mol/L or less, the life performance is improved by making the density of the positive electrode material 3.8 g/cm$^3$ or more.

When the density of the positive electrode material is more than 5.0 g/cm$^3$, the influence of a decrease in the capacity of the lead-acid battery becomes non-negligible. Therefore, it is preferable that the density of the positive electrode material is 5.0 g/cm$^3$ or less, more preferably 4.3 g/cm$^3$ or less, and particularly preferably 4.2 g/cm$^3$ or less.

Figure 7:
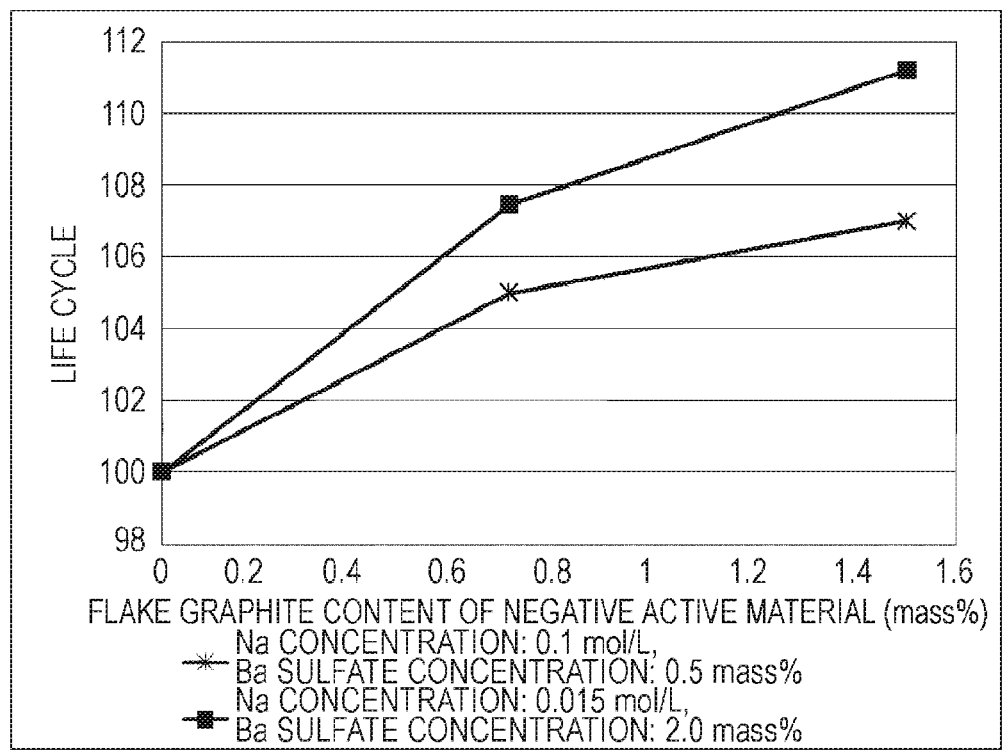
FIG. 7 is a characteristic diagram showing the number of life cycles under conditions where graphite is contained in the negative electrode material.

It is preferable that the negative electrode material contains graphite. Graphite in the negative electrode material significantly improves the life performance of the lead-acid battery in the case where the Ba sulfate concentration in the negative electrode material is 1.0 mass % or more and the Na concentration in the electrolyte solution is 0.04 mol/L or less. Even not in the case where the Ba sulfate concentration in the negative electrode material is 1.0 mass % or more and the Na concentration in the electrolyte solution is 0.04 mol/L or less, the life performance is improved by the presence of graphite in the negative electrode material (FIG. 7). However, the improving effect on the life performance caused by the presence of graphite in the negative electrode material is remarkable in the case where the Ba sulfate concentration in the negative electrode material is 1.0 mass % or more and the Na concentration in the electrolyte solution is 0.04 mol/L or less (FIG. 7). It is an unexpected result that in the case where the Ba sulfate concentration in the negative electrode material is 1.0 mass % or more and the Na concentration in the electrolyte solution is 0.04 mol/L or less, the improving effect on the life performance caused by the presence of graphite in the negative electrode material is remarkable.

When the content of graphite in the negative electrode material is 0.5 mass % or more, the improving effect on the life performance is significant, and thus this is preferable. When the content of graphite in the negative electrode material is 0.7 mass % or more, the improving effect on the life performance is more significant, and thus this is more preferable. In addition, it is preferable that the graphite is flake graphite.

When the content of graphite in the negative electrode material is more than 2.5 mass %, the paste of the negative electrode material becomes so hard that it is difficult to apply the paste to the negative electrode current collector. Therefore, it is preferable that the content of graphite in the negative electrode material is 2.5 mass % or less, more preferably 2.0 mass % or less.

Figure 8:
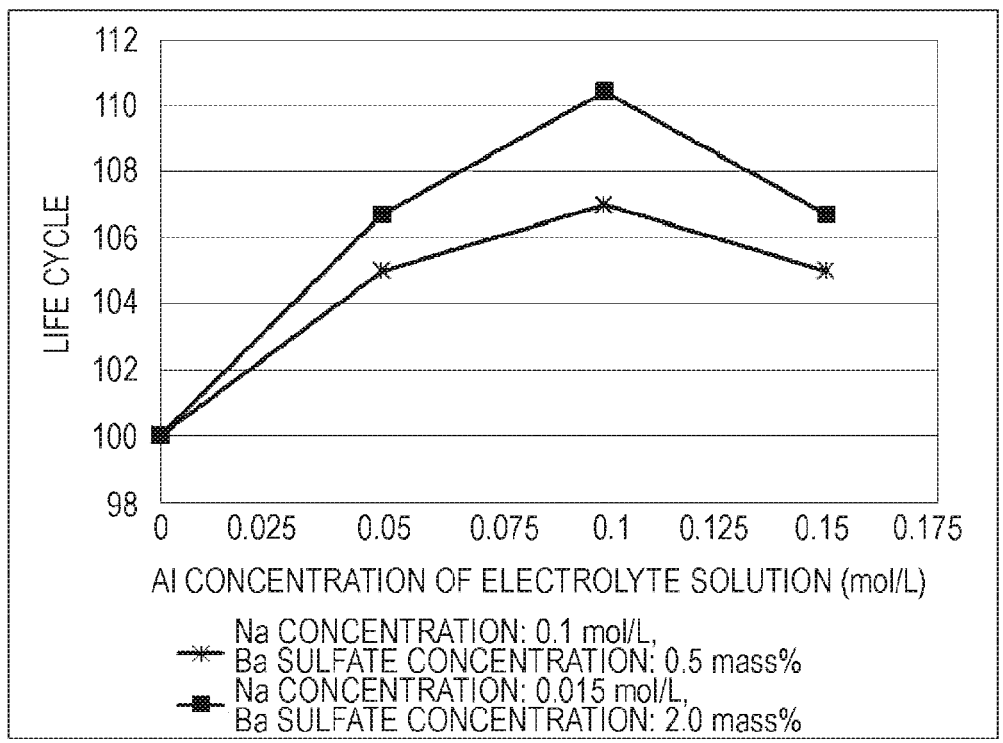
FIG. 8 is a characteristic diagram showing the number of life cycles under conditions where Al is contained in the electrolyte solution.

It is preferable that the electrolyte solution contains Al. Al in the electrolyte solution significantly improves the life performance of the lead-acid battery in the case where the Ba sulfate concentration in the negative electrode material is 1.0 mass % or more and the Na concentration in the electrolyte solution is 0.04 mol/L or less. Even not in the case where the Ba sulfate concentration in the negative electrode material is 1.0 mass % or more and the Na concentration in the electrolyte solution is 0.04 mol/L or less, the life performance is improved by the presence of Al in the electrolyte solution (FIG. 8). However, the improving effect on the life performance caused by the presence of Al in the electrolyte solution is remarkable in the case where the Ba sulfate concentration in the negative electrode material is 1.0 mass % or more and the Na concentration in the electrolyte solution is 0.04 mol/L or less (FIG. 8). It is an unexpected result that in the case where the Ba sulfate concentration in the negative electrode material is 1.0 mass % or more and the Na concentration in the electrolyte solution is 0.04 mol/L or less, the improving effect on the life performance caused by the presence of Al in the electrolyte solution is remarkable.

When the Al concentration in the electrolyte solution is 0.02 mol/L or more, the improving effect on the life performance is significant, and thus this is preferable. When the Al concentration in the electrolyte solution is 0.05 mol/L or more, the improving effect on the life performance is more significant, and thus this is more preferable. In addition, when the Al concentration in the electrolyte solution is 0.2 mol/L or less, the improving effect on the life performance is significant, and thus this is preferable. When the Al concentration in the electrolyte solution is 0.15 mol/L or less, the improving effect on the life performance is more significant, and thus this is more preferable.

Figure 9:
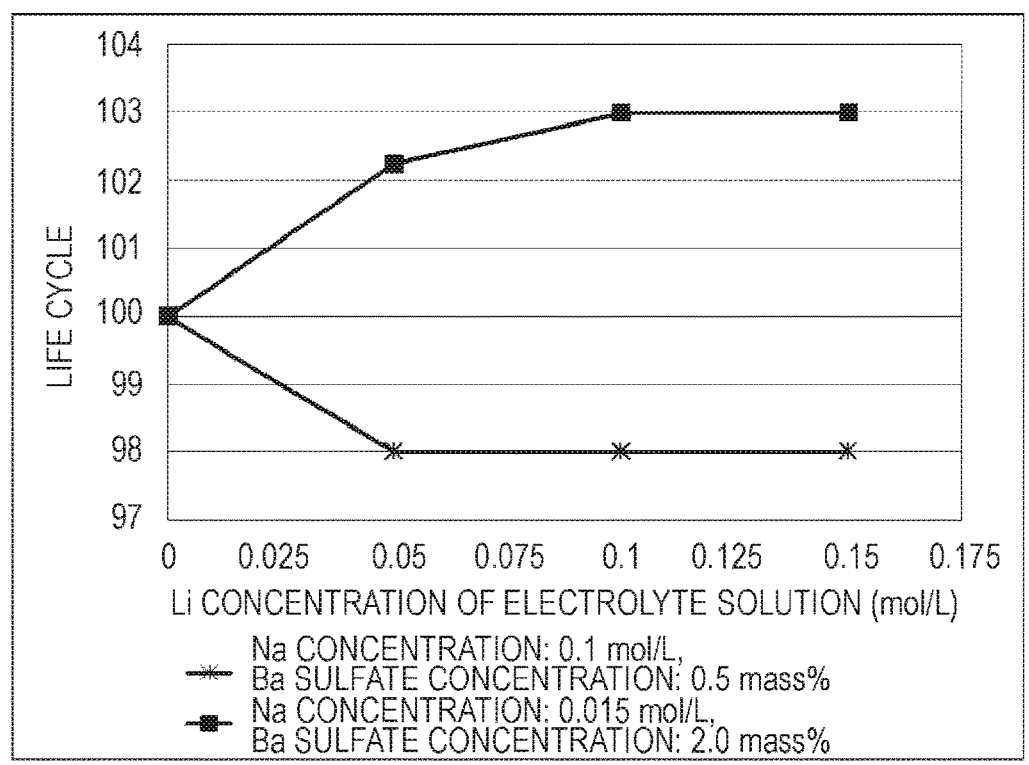
FIG. 9 is a characteristic diagram showing the number of life cycles under conditions where Li is contained in the electrolyte solution.

It is preferable that the electrolyte solution contains Li. Li in the electrolyte solution improves the life performance of the lead-acid battery in the case where the Ba sulfate concentration in the negative electrode material is 1.0 mass % or more and the Na concentration in the electrolyte solution is 0.04 mol/L or less (FIG. 9). Meanwhile, not in the case where the Ba sulfate concentration in the negative electrode material is 1.0 mass % or more and the Na concentration in the electrolyte solution is 0.04 mol/L or less, the life performance of the lead-acid battery rather decreases when Li is contained in the electrolyte solution (FIG. 9). It is an unexpected result that only in the case where the Ba sulfate concentration in the negative electrode material is 1.0 mass % or more and the Na concentration in the electrolyte solution is 0.04 mol/L or less, the life performance is improved by the presence of Li in the electrolyte solution.

When the Li concentration in the electrolyte solution is 0.02 mol/L or more, the improving effect on the life performance is significant, and thus this is preferable. When the Li concentration in the electrolyte solution is 0.05 mol/L or more, the improving effect on the life performance is still more significant, and thus this is more preferable. When the Li concentration in the electrolyte solution is 0.1 mol/L or more, the improving effect on the life performance is still more significant, and thus this is still more preferable.

When the Li concentration in the electrolyte solution is more than 0.2 mol/L, the charge acceptance performance decreases. Therefore, it is preferable that the Li concentration in the electrolyte solution is 0.2 mol/L or less, more preferably 0.15 mol/L or less.

The lead-acid battery according to the aspect of the present invention is excellent in terms of charge acceptance performance both immediately after discharge and after standing, and thus is suitable for use as a lead-acid battery for idling-stop and the like, which is not sufficiently charged.

Hereinafter, examples will be shown. To implement the invention, the examples may be suitably modified according to the common knowledge of those skilled in the art and the disclosure of related art. Incidentally, in the examples, a negative electrode material may be referred to as a negative active material, while a positive electrode material may be referred to as a positive active material. In addition, a negative electrode plate is made of a negative electrode current collector (negative electrode grid) and a negative electrode material (negative active material), while a positive electrode plate is made of a positive current collector (positive electrode grid) and a positive electrode material (positive active material). Solid constituents other than the current collectors (grids) belong to electrode materials (active materials).

The concentrations of Ba sulfate and graphite in the negative electrode material and Na, Al, Li, and like additives in the electrolyte solution, the density of the positive electrode material, and the like are values in a fully charged state. Incidentally, a fully charged state is a state in which the battery has been charged at 5-hour rate current until the terminal voltage during discharge measured every 15 minutes shows a constant value 3 times in a row.

EXAMPLES

A negative active material was prepared by mixing a lead powder, which was obtained by a ball-mill method, with a predetermined amount of Ba sulfate (average primary particle size: 0.79 μm, average secondary particle size: 2.5 μm), carbon, lignin, and plastic fibers as a reinforcing material to make the total 100 mass % with the lead powder. The Ba sulfate concentration was varied within a range of 0.5 mass % to 4.0 mass % relative to the amount of negative active material after full charge. The lignin content was 0.2 mass %, but the concentration is arbitrary. In addition, the production method for the lead powder, the oxygen content, and the like are arbitrary, and other additives, water-soluble synthetic polyelectrolytes, and the like may also be contained. Incidentally, in place of Ba sulfate, it is also possible to use elemental Ba or a Ba compound such as Ba carbonate.

The mixture was pasted with water and sulfuric acid, and the paste was applied to and filled in an expanded negative electrode grid made of a Pb—Ca—Sn-based alloy, then aged, and dried. Incidentally, the amount of water at the time of pasting and applying conditions were varied to adjust the density and thickness of the negative active material, thereby adjusting the mass of the negative electrode plate. In addition, the negative electrode grid may be a cast grid, a punched grid, or the like.

The mass of the negative electrode plate was adjusted by adjusting the mass of the negative active material, but may also be adjusted by adjusting the mass of the negative electrode grid by adjusting the width, the number, or the like of crosspieces of the negative electrode grid. An increase in the mass of the negative active material and an increase in the mass of the negative electrode grid have the same effects.

A positive active material was prepared by mixing a lead powder, which was obtained by a ball-mill method, with plastic fibers as a reinforcing material, and the mixture was pasted with water and sulfuric acid. The paste was applied to an expanded positive electrode grid made of a Pb—Ca—Sn-based alloy, then aged, and dried. Incidentally, the amount of water at the time of pasting was varied to adjust the density of the positive active material. In addition, the positive electrode grid may be a cast grid, a punched grid, or the like.

Unformed (not yet subjected to formation) negative electrode plates were each covered with a polyethylene separator. Six unformed negative electrode plates and five unformed positive electrode plates were alternately layered, and the negative electrode plates and the positive electrode plates were each connected with a strap to make an element. In addition, the thickness of the separator was adjusted according to changes in the thickness of the negative electrode plates caused by the adjustment of the mass of the negative electrode plates. Incidentally, it is also possible to cover positive electrode plates with a separator. The element was placed in a cell chamber of the container, and sulfuric acid having a specific gravity of 1.230 was added at 20° C. to perform container formation, thereby giving a flooded type lead-acid battery of B20 size. It may also be a valve-regulated lead-acid battery. After formation, a predetermined amount of sodium sulfate was added to the electrolyte solution, and the Na concentration of the electrolyte solution was adjusted within a range of 0.015 mol/L to 0.10 mol/L.

Figure 1:
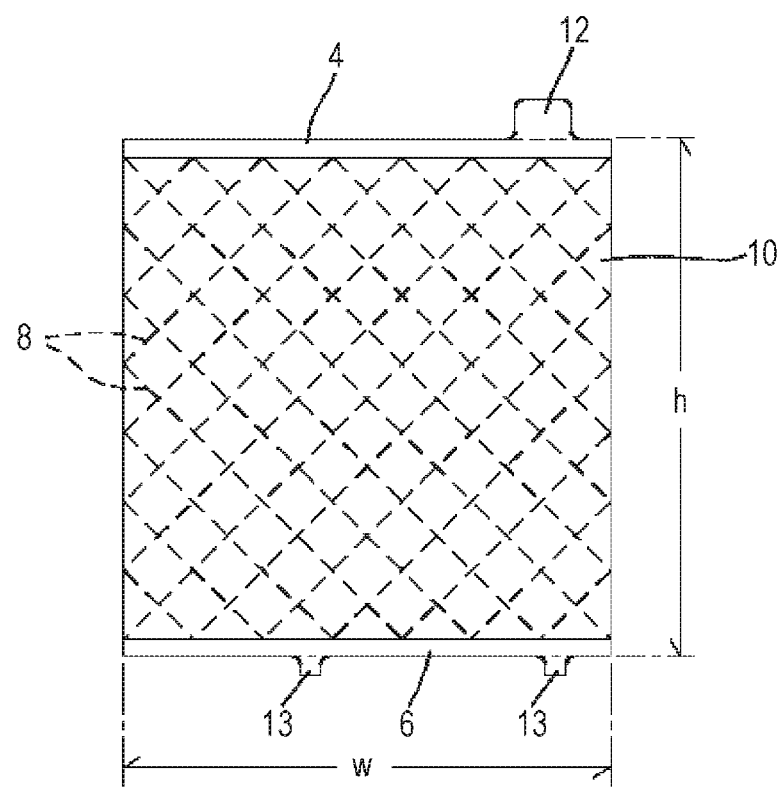
FIG. 1 is a front view of a negative electrode plate.

FIG. 1 illustrates a negative electrode plate 2, where numerals 4 and 6 denote upper and lower frames, numeral 8 denotes a crosspiece, and numeral 10 denotes a negative active material. Numeral 12 denotes a lug and numeral 13 denotes a foot. The height of the grid excluding the lug 12 and the feet 13 is defined as the height h of the negative electrode plate 2, and the width of the negative electrode plate 2 is expressed as w. If there is a projection in the width direction, the width w is determined excluding the projection.

Figure 2:
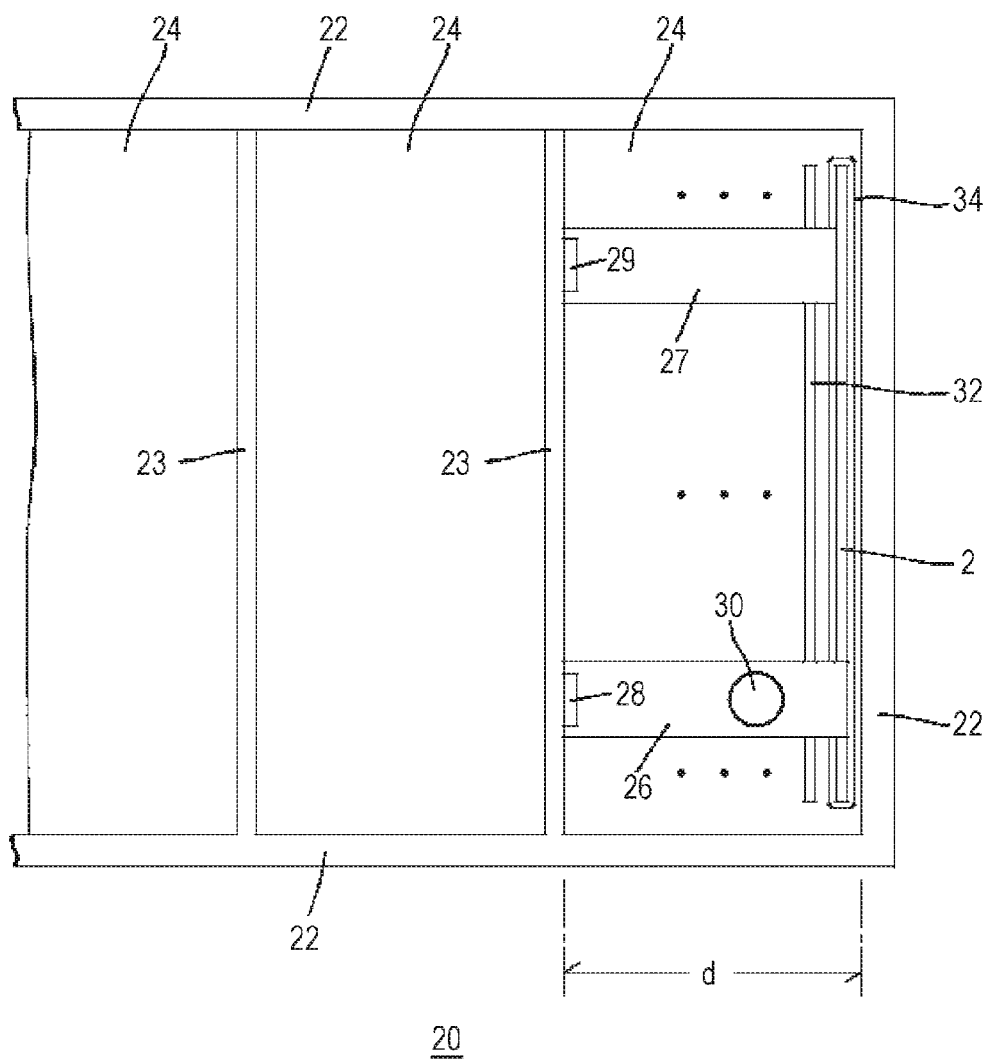
FIG. 2 is a plan view of part of a lead-acid battery with a lid removed.

FIG. 2 illustrates a lead-acid battery 20, where numeral 22 denotes a container, numeral 23 denotes a partition, and six cell chambers 24 are arranged in series. Numeral 26 denotes a strap on the negative electrode side, numeral 27 denotes a strap on the positive electrode side, numerals 28 and 29 denote cell-connecting conductors, and numeral 30 denotes a pole. Numeral 2 denotes the negative electrode plate as mentioned above, numeral 32 denotes a positive electrode plate, and numeral 34 denotes a separator that may also cover the positive electrode plate 32. The inside dimension of the cell chamber 24 in the direction perpendicular to the plates 2 and 32 is expressed as d. Using the inside dimension d, the height h of the negative electrode plates 2, and the width w of the negative electrode plates, the effective volume V of the cell chamber 24 is defined as V=hwd.

The concentration of Ba contained in the formed negative active material is quantified as follows. A lead-acid battery in a fully charged state is disassembled, the negative electrode plates are washed with water and dried to remove the sulfate content, and the negative active material is collected. The negative active material is ground, a 300 g/L hydrogen peroxide solution is added in an amount of 20 mL per 100 g of the negative active material. Further, (1+3) nitric acid, which is prepared by diluting 60 mass % concentrated nitric acid with three times its volume of ion exchange water, is added and then is heated for 5 hours with stirring, thereby dissolving lead as lead nitrate. Furthermore, Ba sulfate is dissolved, and the Ba concentration in the solution is quantified by atomic absorption measurement and converted into the Ba concentration in the negative active material. The Ba sulfate concentration in the negative active material can be determined from the Ba concentration in the negative active material.

For the concentrations of Na, Al, and Li in the electrolyte solution, the electrolyte solution is extracted from the lead-acid battery in a fully charged state, and each concentration is quantified by ICP analysis.

The content of graphite in the negative active material is quantified as follows. A lead-acid battery in a fully charged state is disassembled, the negative electrode plates are washed with water and dried to remove the sulfate content, and the negative active material is collected. The negative active material is ground, a hydrogen peroxide solution having a concentration of 300 g/L is added in an amount of 20 mL per 100 g of the negative active material. Further, (1+3) nitric acid, which is prepared by diluting 60 mass % concentrated nitric acid with three times its volume of ion exchange water, is added and then is heated for 5 hours with stirring, thereby dissolving lead as lead nitrate. Next, solid matters such as graphite, carbon, and the reinforcing material are separated by filtration.

The solid matters obtained by filtration are dispersed in water. The dispersion liquid is sieved twice using a sieve having a size of 1.4 mm to remove the reinforcing material. Next, centrifugal separation is performed at 3000 rpm for 5 minutes, and carbon and graphite are extracted from the supernatant and the upper precipitate.

Next, the extracted carbon and graphite are separated. 15 mL of VANILLEX N manufactured by Nippon Paper Industries Co., Ltd., is added per 100 mL of the supernatant and upper precipitate extracted, followed by a stirring operation.

After the above operation, a centrifugation operation is performed at 3000 rpm for 5 minutes, and the supernatant and precipitate are all passed through a sieve having a size of 20 μm. Graphite does not to pass through the sieve and thus remains on the sieve. A large amount of hot water is poured over graphite remaining on the sieve to remove VANILLEX N, followed by washing with water and drying. The graphite washed with water and dried was weighed, and the weight is converted into the content of graphite in the negative active material.

The quantification method for the density of the positive electrode material is as follows. The formed positive electrode material in a fully charged state is washed with water and dried, and the positive electrode material is separated from the positive electrode grid. The separated positive electrode material is, in an unground state, measured for the density by the following procedures.

a) The apparent density (g/cm$^3$) of the positive electrode material including closed pores is measured by a pycnometer method.

b) The open pore volume per unit mass (cm$^3$/g) of the positive electrode material is measured by a mercury intrusion method. In the mercury intrusion method, pressure is applied to the maximum pressure of 4.45 psia (30.7 KPa), the contact angle is set to be 130', and the mercury surface tension is set to be 484 dynes/cm.

c) The density of the positive electrode material is determined as follows: 1÷[(1÷apparent density of positive electrode material)+(open pore volume per unit mass of positive electrode material)]. As mentioned above, the density of the positive electrode material is the density of the closed pores, open pores, and the positive electrode material in the formed positive electrode material after full charge.

The obtained lead-acid battery was discharged from the fully charged state at 5-hour rate current for 30 minutes, and then charged at a constant voltage of 14.5 V for 10 seconds, and the quantity of electricity at that time was measured as the charge acceptance performance without standing (without being remained untouched). In addition, the battery was discharged from the fully charged state at 5-hour rate current for 30 minutes, allowed to stand (be remained untouched) for 12 hours, and then charged at a constant voltage of 14.5 V for 10 seconds, and the quantity of electricity at that time was measured as the charge acceptance performance with standing.

As a life test, a 1000-cycle test was performed in one week in accordance with the standard of Battery Association of Japan (SBA S0101 9.4.5) modified as follows:

a cycle including discharge at 1-hour rate current for 59 seconds, discharge at 300 A for 1 second, and charge at 14 V for 60 seconds was performed;

a pause of 2 hours was given every 30 cycles; and the internal resistance was measured every 1000 cycles. Incidentally, the internal resistance was measured by an alternating current four-probe method. Then, when the discharge voltage became less than 7.2 V, it was defined as the life. The results are shown in Table 1 and FIGS. 3 to 5. The charge acceptance performance (with standing and without standing) and the number of life cycles are expressed as values relative to the sample A19 in Table 1 as 100 (comparative example in which NP/V is 1.40 g/cm$^3$, the Na concentration is 0.10 mol/L, and Ba sulfate is 0.5 mass %). In addition, the internal resistance is expressed as a value relative to the internal resistance of each lead-acid battery before the life test as 1.

TABLE 1

| | NP/V (g/cm$^3$) | Na concentration (mol/L) | Ba Sulfate concentration (mass %) | Charge acceptance performance | | Rate of increase in internal resistance | Life cycle, relative to A19 | Remarks |
|---|---|---|---|---|---|---|---|---|
| | | | | Without standing, relative to A19 | With standing, relative to A19 | | | |
| A1 | 1.40 | 0.015 | 0.5 | 115 | 123 | 1.10 | 116 | Comparative example |
| A2 | 1.40 | 0.015 | 1.0 | 118 | 121 | 1.09 | 119 | Example |
| A3 | 1.40 | 0.015 | 1.2 | 118 | 119 | 1.07 | 128 | Example |
| A4 | 1.40 | 0.015 | 2.0 | 122 | 117 | 1.06 | 134 | Example |
| A5 | 1.40 | 0.015 | 3.0 | 124 | 116 | 1.07 | 135 | Example |
| A6 | 1.40 | 0.015 | 4.0 | 125 | 115 | 1.06 | 135 | Example |
| A7 | 1.40 | 0.035 | 0.5 | 112 | 117 | 1.14 | 113 | Comparative example |
| A8 | 1.40 | 0.035 | 1.0 | 115 | 113 | 1.13 | 116 | Example |
| A9 | 1.40 | 0.035 | 1.2 | 116 | 112 | 1.10 | 123 | Example |
| A10 | 1.40 | 0.035 | 2.0 | 119 | 111 | 1.10 | 128 | Example |
| A11 | 1.40 | 0.035 | 3.0 | 121 | 108 | 7.09 | 129 | Example |
| A12 | 1.40 | 0.035 | 4.0 | 121 | 107 | 1.09 | 128 | Example |
| A13 | 1.40 | 0.05 | 0.5 | 106 | 110 | 1.20 | 108 | Comparative example |

TABLE 1-continued

| | NP/V (g/cm³) | Na concentration (mol/L) | Ba Sulfate concentration (mass %) | Charge acceptance performance Without standing, relative to A19 | Charge acceptance performance With standing, relative to A19 | Rate of increase in internal resistance | Life cycle, relative to A19 | Remarks |
|---|---|---|---|---|---|---|---|---|
| A14 | 1.40 | 0.05 | 1.0 | 111 | 103 | 1.19 | 111 | Comparative example |
| A15 | 1.40 | 0.05 | 1.2 | 112 | 101 | 1.19 | 117 | Comparative example |
| A16 | 1.40 | 0.05 | 2.0 | 117 | 96 | 1.19 | 119 | Comparative example |
| A17 | 1.40 | 0.05 | 3.0 | 120 | 89 | 1.18 | 119 | Comparative Example |
| A18 | 1.40 | 0.05 | 4.0 | 121 | 88 | 1.18 | 119 | Comparative example |
| A19 | 1.40 | 0.10 | 0.5 | 100 | 100 | 1.21 | 100 | Comparative example |
| A20 | 1.40 | 0.10 | 1.0 | 105 | 94 | 1.20 | 103 | Comparative Example |
| A21 | 1.40 | 0.10 | 1.2 | 106 | 92 | 1.20 | 106 | Comparative example |
| A22 | 1.40 | 0.10 | 2.0 | 110 | 87 | 7.20 | 108 | Comparative example |
| A23 | 1.40 | 0.10 | 3.0 | 113 | 81 | 1.19 | 110 | Comparative Example |
| A24 | 1.40 | 0.10 | 4.0 | 114 | 80 | 1.19 | 112 | Comparative Example |
| B1 | 1.25 | 0.015 | 2.0 | 120 | 115 | 1.12 | 116 | Example |
| B2 | 1.30 | 0.015 | 2.0 | 121 | 115 | 1.08 | 126 | Example |
| B3 | 1.50 | 0.015 | 2.0 | 123 | 118 | 1.06 | 141 | Example |
| B4 | 1.60 | 0.015 | 2.0 | 122 | 116 | 1.10 | 133 | Example |
| B5 | 1.70 | 0.015 | 2.0 | 122 | 115 | 1.16 | 113 | Example |

Table 1 shows that with an increase in the concentration of Ba sulfate contained in the negative active material, the charge acceptance performance with standing improves, but the charge acceptance performance with standing decreases. FIG. 3 is a graph showing the charge acceptance performance of the lead-acid batteries A1 to A24 with standing in Table 1. The charge acceptance performance is expressed as a value relative to the charge acceptance performance with standing of each lead-acid battery having a Ba sulfate concentration of 0.5 mass % at each Na concentration (=100). In the case where the Na concentration of the electrolyte solution is 0.05 mol/L or 0.10 mol/L, when the Ba sulfate concentration in the negative active material is 1.0 mass % or more, the charge acceptance performance with standing significantly decreases (FIG. 3). Meanwhile, in the case where the Na concentration of the electrolyte solution is 0.015 mol/L or 0.035 mol/L, even when the Ba sulfate concentration in the negative active material is 1.0 mass % or more, the charge acceptance performance with standing does not decrease as much as in the case where the Na concentration of the electrolyte solution is 0.05 mol/L or 0.10 mol/L (FIG. 3). Therefore, it can be said that the suppressing effect on a decrease in the charge acceptance performance with standing is high in the case where the Na concentration of the electrolyte solution is 0.04 mol/L or less and the Ba sulfate concentration in the negative active material is 1.0 mass % or more. It has been heretofore unknown that the suppressing effect on a decrease in the charge acceptance performance with standing is high in the case where the Na concentration of the electrolyte solution is 0.04 mol/L or less and the Ba sulfate concentration in the negative active material is 1.0 mass % or more. Thus, this was an unexpected result.

Further, in the case where the Na concentration in the electrolyte solution was 0.04 mol/L or less, when the Ba sulfate concentration in the negative active material was 1.2 mass % or more, the rate of increase in the internal resistance at the $2000^{th}$ cycle was significantly suppressed (FIG. 4). Meanwhile, even not in the case where the Na concentration in the electrolyte solution was 0.04 mol/L or less, when the Ba sulfate concentration in the negative active material was 1.0 mass %, the suppressing effect on the rate of increase in the internal resistance at the $2000^{th}$ cycle was small. Thus, the tendency was significantly different between Ba sulfate concentrations of 1.0 mass % or less and 1.2 mass % or more (FIG. 4). In addition, in the case where the Na concentration in the electrolyte solution was more than 0.04 mol/L, even when the Ba sulfate concentration in the negative active material was 1.2 mass % or more, the rate of increase in the internal resistance at the $2000^{th}$ cycle did not change much (FIG. 4). It has been heretofore unknown that an increase in the internal resistance in accordance with the progress of charge-discharge cycles is suppressed in the case where the Na concentration in the electrolyte solution is 0.04 mol/L or less and the Ba sulfate concentration in the negative active material is 1.2 mass % or more. Thus, this was an unexpected result.

The samples B1 to B5 and the sample A4 in Table 1 show the influence of the total mass NP of negative electrode plates per effective volume V of the cell chamber (NP/V) on the rate of increase in the internal resistance at the $2000^{th}$ cycle. An increase in the internal resistance in accordance with the progress of charge-discharge cycles was suppressed when NP/V was 1.30 g/cm³ or more and 1.60 g/cm³ or less (FIG. 5). In particular, when NP/V was 1.40 g/cm³ or more and 1.50 g/cm³ or less, an increase in the internal resistance in accordance with the progress of charge-discharge cycles was significantly suppressed (FIG. 5). It has been heretofore unknown that the total mass NP of negative electrode plates per effective volume V of the cell chamber (NP/V) affects the rate of increase in the internal resistance in accordance with the progress of charge-discharge cycles. Therefore, it is an unexpected result that an increase in the internal resistance in accordance with the progress of charge-discharge cycles can be significantly suppressed when NP/V is 1.30 g/cm$^3$ or more and 1.60 g/cm$^3$ or less, preferably 1.40 g/cm$^3$ or more and 1.50 g/cm$^3$ or less.

FIG. 6 shows the influence of the density of the positive active material on the life performance, and NP/V was set at 1.40 g/cm$^3$. Taking the number of life cycles of a battery, in which the Na concentration of the electrolyte solution is 0.1 mol/L, the Ba sulfate concentration in the negative active material is 0.5 mass %, and the density of the positive active material is 3.70 g/cm$^3$, as 100, the number of life cycles of each battery is shown. In the case where the Na concentration in the electrolyte solution was 0.04 mol/L or less and the Ba sulfate concentration in the negative active material was 1.0 mass % or more, when the density of the positive active material was 3.80 g/cm$^3$ or more, the number of life cycles increased (FIG. 6). In particular, when the density of the positive active material was 3.90 g/cm$^3$ or more, the number of life cycles significantly increased. Meanwhile, in the case where the Na concentration was 0.1 mol/L and the Ba sulfate concentration was 0.5 mass %, when the density of the positive active material was 3.80 g/cm$^3$ or more, the number of life cycles decreased (FIG. 6). Therefore, it can be said that under conditions where the density of the positive active material is 3.80 g/cm$^3$ or more, the tendency of the life test results is completely different between the case where the Na concentration in the electrolyte solution is 0.04 mol/L or less and the Ba sulfate concentration in the negative active material is 1.0 mass % or more and other cases.

The effect of the addition of graphite to the negative active material and the effect of the addition of Al and Li to the electrolyte solution were examined. As comparative examples, under conditions where the Na concentration of the electrolyte solution was 0.1 mol/L and the Ba sulfate concentration in the negative active material was 0.5 mass %, lead-acid batteries having flake graphite contained in the negative active material and lead-acid batteries having Al or Li contained in the electrolyte solution were produced. In addition, as examples, under conditions where the Na concentration in the electrolyte solution was 0.015 mol/L and the Ba sulfate concentration in the negative active material was 2.0 mass %, lead-acid batteries having flake graphite contained in the negative active material and lead-acid batteries having Al or Li contained in the electrolyte solution were produced. The production conditions were the same as in Example A4 and Comparative Example A19, except for the concentrations of flake graphite, Al, and Li. The test results of these batteries are shown in FIGS. 7 to 9. Incidentally, in FIGS. 7 to 9, with respect to each of the case where the Na concentration of the electrolyte solution was 0.1 mol/L and the Ba sulfate concentration in the negative active material was 0.5 mass % and the case where the Na concentration in the electrolyte solution was 0.015 mol/L and the Ba sulfate concentration in the negative active material was 2.0 mass %, the number of life cycles of each battery is shown taking the number of life cycles of a battery having no flake graphite contained in the negative active material and no Al or Li contained in the electrolyte solution as 100.

FIG. 7 shows the influence of the graphite content of the negative active material on the life performance. When the negative active material contains graphite, even in the case where the Na concentration in the electrolyte solution is high and the Ba sulfate concentration in the negative active material is low, the life performance improves. However, in the case where the Na concentration is 0.04 mol/L or less and the Ba sulfate concentration is 1.0 mass % or more, the life performance is improved even more significantly by the presence of graphite in the negative active material. When the content of graphite in the negative electrode material is within a range of 0.7 mass % or more, the improving effect on the life performance is particularly significant. It has been heretofore unknown that the improving effect on the life performance caused by the presence of graphite in the negative electrode material is remarkable in the case where the Na concentration in the electrolyte solution is 0.04 mol/L or less and the Ba sulfate concentration in the negative electrode material is 1.0 mass % or more. Thus, this is an unexpected result.

FIG. 8 shows the influence of the Al concentration of the electrolyte solution on the life performance. When the electrolyte solution contains Al, even in the case where the Na concentration in the electrolyte solution is high and the Ba sulfate concentration in the negative active material is low, the life performance improves. However, in the case where the Na concentration is 0.04 mol/L or less and the Ba sulfate concentration is 1.0 mass % or more, the life performance is improved even more significantly by the presence of Al in the electrolyte solution. The improving effect on the life performance is particularly significant when the concentration of Al in the electrolyte solution is within a range of 0.05 mol/L or more. It has been heretofore unknown that the improving effect on the life performance caused by the presence of Al in the electrolyte solution is remarkable in the case where the Na concentration in the electrolyte solution is 0.04 mol/L or less and the Ba sulfate concentration in the negative electrode material is 1.0 mass % or more. Thus, this is an unexpected result.

FIG. 9 shows the influence of the Li concentration of the electrolyte solution on the life performance. When the electrolyte solution contains Li, in the case where the Na concentration in the electrolyte solution is high and the Ba sulfate concentration in the negative active material is low, the life performance decreases. Meanwhile, in the case where the Na concentration is 0.04 mol/L or less and the Ba sulfate concentration is 1.0 mass % or more, the life performance improves when the electrolyte solution contains Li. The improving effect on the life performance is particularly significant when the concentration of Li in the electrolyte solution is within a range of 0.05 mol/L or more. Therefore, it can be said that under conditions where the electrolyte solution contains Li, the tendency of the life test results is completely different between the case where the Na concentration in the electrolyte solution is 0.04 mol/L or less and the Ba sulfate concentration in the negative active material is 1.0 mass % or more and other cases.

Although the lead-acid batteries in the Examples are flooded type batteries, they may also be valve-regulated batteries. In addition, the lead-acid batteries can be used not only for idling-stop vehicles but also for charge-control vehicles, and are suitable as batteries for use under PSOC (Partial State of Charge) conditions. However, the application is arbitrary.

What is claimed is:
1. A lead-acid battery, comprising:
a positive electrode plate;
a negative electrode plate;
an electrolyte solution; and a container having a cell chamber in which the positive electrode plate, the negative electrode plate and the electrolyte solution are accommodated, wherein a concentration of Ba sulfate contained in a negative electrode material of the negative electrode plate is 1.0 mass % or more, a Na concentration in the electrolyte solution is 0.005 mol/L or more and 0.04 mol/L or less, and when a total mass of the negative electrode plate per cell is expressed as NP (g), and a volume defined by a height of the negative electrode plate×a width of the negative electrode plate×an inside dimension of the cell chamber in a direction perpendicular to the negative electrode plate is expressed as V ($cm^3$), NP/V is 1.3 g/$cm^3$ or more.

2. A lead-acid battery, comprising:
a positive electrode plate;
a negative electrode plate;
an electrolyte solution; and
a container having a cell chamber in which the positive electrode plate, the negative electrode plate and the electrolyte solution are accommodated, wherein a concentration of Ba contained in a negative electrode material of the negative electrode plate is 0.6 mass % or more, a Na concentration in the electrolyte solution is 0.005 mol/L or more and 0.04 mol/L or less, and when a total mass of the negative electrode plate per cell is expressed as NP (g), and a volume defined by a height of the negative electrode plate×a width of the negative electrode plate×an inside dimension of the cell chamber in a direction perpendicular to the negative electrode plate is expressed as V ($cm^3$), NP/V is 1.3 g/$cm^3$ or more.

3. The lead-acid battery according to claim 1, wherein the concentration of Ba sulfate contained in the negative electrode material is 1.2 mass % or more.

4. The lead-acid battery according to claim 2, wherein the concentration of Ba contained in the negative electrode material is 0.7 mass % or more.

5. A lead-acid battery, comprising:
a positive electrode plate;
a negative electrode plate;
an electrolyte solution; and
a container having a cell chamber in which the positive electrode plate, the negative electrode plate and the electrolyte solution are accommodated, wherein a concentration of Ba sulfate contained in a negative electrode material of the negative electrode plate is 1.0 mass % or more, a Na concentration in the electrolyte solution is 0.005 mol/L or more and 0.04 mol/L or less, and when a total mass of the negative electrode plate per cell is expressed as NP (g), and a volume defined by a height of the negative electrode plate×a width of the negative electrode plate×an inside dimension of the cell chamber in a direction perpendicular to the negative electrode plate is expressed as V ($cm^3$), NP/V is 1.6 g/$cm^3$ or less.

6. The lead-acid battery according to claim 1, wherein a density of a positive electrode material of the positive electrode plate is 3.8 g/$cm^3$ or more.

7. The lead-acid battery according to claim 1, wherein the negative electrode material contains graphite.

8. The lead-acid battery according to claim 1, wherein the negative electrode material contains graphite in an amount of 0.5 mass % or more.

9. The lead-acid battery according to claim 1, wherein the electrolyte solution contains Al.

10. The lead-acid battery according to claim 1, wherein the electrolyte solution contains Al in an amount of 0.02 mol/L or more.

11. The lead-acid battery according to claim 1, wherein the electrolyte solution contains Li.

12. The lead-acid battery according to claim 1, wherein the electrolyte solution contains Li in an amount of 0.02 mol/L or more.

13. The lead-acid battery according to claim 1, wherein the negative electrode material contains flake graphite.

14. The lead-acid battery according to claim 1, wherein the lead-acid battery is a lead-acid battery for an idling-stop vehicle.

15. The lead-acid battery according to claim 1, wherein the lead-acid battery is a flooded type lead-acid battery.

16. The lead-acid battery according to claim 1, wherein the negative electrode plate comprises a Pb—Ca—Sn alloy grid.

17. The lead-acid battery according to claim 2, wherein the negative electrode plate comprises a Pb—Ca—Sn alloy grid.

* * * * *